United States Patent

[11] 3,585,521

| [72] | Inventor | Charles W. Baugh<br>Severna Park, Md. |
|---|---|---|
| [21] | Appl. No | 883,685 |
| [22] | Filed | Dec. 22, 1969 |
| [45] | Patented | June 15, 1971 |
| [73] | Assignee | Westinghouse Electric Corporation<br>Pittsburgh, Pa.<br>Continuation of Ser. No. 524,737, Feb. 3, 1966, abandoned. |

[54] STIMULATED EMISSION OF RADIATION DEVICE
2 Claims, 4 Drawing Figs.

| [52] | U.S. Cl. | 331/94.5 |
|---|---|---|
| [51] | Int. Cl. | H01s 3/00 |
| [50] | Field of Search | 331/94.5 |

[56] References Cited
UNITED STATES PATENTS

| 3,140,451 | 7/1964 | Fox | 331/94.5 |
| 3,197,715 | 7/1965 | Ashkin | 331/94.5 |
| 3,222,615 | 12/1965 | Holly | 331/94.5 |
| 3,314,021 | 4/1967 | Haun, Jr. et al | 331/94.5 |

FOREIGN PATENTS

| 1,183,597 | 12/1964 | Germany |
| 1,356,934 | 2/1964 | France |

Primary Examiner—Ronald L. Wibert
Assistant Examiner—V. P. McGraw
Attorneys—F. H. Henson, E. P. Klipfel and John L. Wiegreffe ABSTRACT: Stimulated emission of radiation amplifier utilizing a negative temperature media having phonon transitions coupled to either end of the electronic transitions. These materials are substantially transparent to optical energy and the media here is pumped directly by high voltage electrons. The media illustrated is in the form of a thin film closed ring providing a cavity geometry which does not utilize physical reflecting mirrors.

PATENTED JUN 15 1971

WITNESSES
Theodore F. Wrobel
Edwin E. Bassler

INVENTOR
Charles W. Baugh
BY
John L. Wiegreffe
ATTORNEY

STIMULATED EMISSION OF RADIATION DEVICE

This application is a continuation of my application Ser. No. 524,758, filed Feb. 3, 1966 and now abandoned.

This invention relates to a stimulated emission of radiation device, commonly referred to as a maser or laser, depending upon the operating frequency, and more particularly to a novel and improved laser in which the active medium is pumped directly by electrons.

For certain types of operations, as further discussed hereinafter, it is highly desirable to have the amount of energy which can be stored in the negative temperature condition as high as possible.

At ordinary temperatures the atoms, molecules or lattice sites of a maser medium, as well as all other matter, are in a state of thermal equilibrium. Therefore, in order to excite the atoms or molecules of the system from the equilibrium state to the nonequilibrium state, it is necessary to supply energy to the system.

In such a system when the stored potential energy, represented by the negative temperature of the medium, is released it will be in the form of wave energy at discrete frequencies. The frequencies are determined by the energy level differences as given by the equation $$Y = E2 - E1/h \quad (1)$$

where $E2$ and $E1$ represent, respectively, the upper and lower energy levels and $h$ is Planck's Constant. If there be applied to the active medium, which is at a negative temperature, a frequency which satisfies equation (1) the applied signal will stimulate the emission of radiation at the signal frequency and the radiated energy will be in phase with, and amplify, the applied signal. Stimulated emission of radiation oscillation will occur when the number of excited electrons is sufficiently great that the power of stimulated emission exceeds the power lost in the system.

Because of the novel features of the present invention, hereinafter further delineated, the present invention lends itself both to continuous and pulsed types of operation.

In a copending application for Optical Maser, Ser. No. 452,275, filed Apr. 30, 1965, and now abandoned in the name of Jon W. Ogland, which application is owned by the assignee of this application, there is described and claimed an optical maser in which the maser medium is pumped to provide state preparation by direct irradiation by an electron beam. The present invention is directed to the same general type of maser operation as is disclosed in that latter copending application and it is an object of the invention to provide an improvement in the latter type of optical maser.

Another object is to provide a novel and improved stimulated emission of radiation device embodying improved means and method for converting electrical energy to a form of energy which is utilized for providing state preparation of the active medium.

Another object is to provide a novel and improved stimulated emission of radiation device in which the negative temperature medium can operate at a higher efficiency to thereby make it possible to greatly increase the output of a continuous wave optical maser.

Another object is to provide a novel and improved stimulated emission of radiation device wherein the negative temperature medium is in such configuration that it facilitates improved cooling, thus permitting greatly increased power output.

Another object is to provide a novel and improved stimulated emission of radiation device utilizing a medium which has a very strong coupling between the lattice and the electronic transitions.

Another object is to provide a novel and improved stimulated emission of radiation device utilizing a negative temperature medium which has very fast phonon transitions coupled with electronic transitions whereby an improved energy storage capacity is provided at the same time a very fast relaxation rate can be provided for producing very intense output laser spikes.

Another object is to provide a novel and improved stimulated emission of radiation device utilizing a novel pumping technique with a novel geometry and new material.

Another object is to provide a novel and improved stimulated emission of radiation device in which there is utilized a negative temperature medium having phonon transitions coupled to the opposite ends of an electronic transition and in which the medium is pumped by irradiation with high voltage electrons.

The invention itself, however, both as to its organization and method of operation as well as additional objects and advantages will best be understood from the following description when read in connection with the accompanying drawing, in which.

Figure 2:
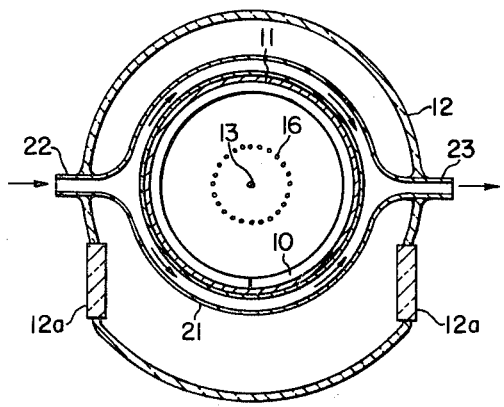
FIG. 2 is a plan sectional view of FIG. 1 on the line II–II and looking in the direction of the arrows.

Generally speaking, the present invention comprises means for pumping a negative temperature medium by direct irradiation by electrons, the medium being of the type having very strong coupling between phonon transitions and the levels of an electron transition.

In all stimulated emission of radiation devices using a pumping cycle in which a portion of the cycle includes "radiationless" decay, some of the energy of the excited electrons is given up to the crystal lattice structure in the form of heat which causes vibration of the lattice and the generation of phonon radiation. In the prior art devices the negative temperature medium was chosen to be associated with a pumping frequency band which would match as near as possible the absorption band to reduce the heating, since any energy absorbed by the medium which is not utilized in the stimulated emission process results in heating of the medium and reduction of its overall efficiency.

Two embodiments of the invention are illustrated in the drawings although it is to be understood that the invention is not limited to these embodiments since the apparatus could take other forms within the knowledge of one skilled in the art.

Because electrons cannot penetrate glass or other materials normally utilized for maintaining an evacuated chamber, the negative temperature medium must be of such geometrical configuration as to make it accessible to the high voltage electrons and at the same time make it possible to extract the usable coherent optical radiation. On the other hand, due to the fact that for high power continuous wave laser operation at room temperature, it is a fundamental requirement that the laser material be relatively thin in order to extract the heat from the medium and maintain the desired operating temperature. For example, at room temperature the thermal conductivity of the dielectric material varies from about 0.01 to 0.4 watts/centimeter degree. Since a practical high power system will conveniently use water as a coolant, the rate of cooling will be determined by the limitation of water cooling. This in on the order of 100 watts per square centimeter. Allowing a 40° centigrade rise in the laser material and assuming a thermal conductivity of 0.1 gives an upper limit of allowed thickness of 0.04 centimeters. For a laser with a 1 kw. output, assuming the laser has an efficiency of 10 percent a laser area of 100 square centimeters would be required. Since most laser materials have a thermal conductivity considerably less than 0.1 watt/centimeter degrees, the thickness would have to be considerably less than 0.04 centimeters if the material were operated at 100 watts per square centimeter at 40° centigrade temperature rise. The foregoing is a very elementary calculation merely to show that it is absolutely necessary to have a laser medium of very thin cross section in order to provide high power continuous output regardless of the manner in which the medium might be pumped. This thickness is entirely too small for efficient absorption of pump energy in the optical frequency range, but can be pumped in accordance with the present invention, as set forth hereinafter.

On the other hand, there is very efficient coupling between high voltage electrons and the ions of solids. Accordingly, a large amount of energy can be coupled into a very small dimension of the solid material. The depth of high voltage electron penetration increases about quadratically with voltage up to 100 Kilovolts. With high voltage electron excitation the choice of operating voltage therefore provides a convenient means of adapting pumping requirements to cooling requirements. The penetration depth at an operating voltage of 30 Kv. is about 4 microns which is well below the maximum thickness that can be efficiently cooled as mentioned above. This voltage would be sufficient for a device with a laser output of about 1 kilowatt. For a giant pulse device, a voltage as high as 1 Mv. is conceivable. For this high voltage the penetration depth would be about 1 millimeter.

The present invention contemplates a stimulated emission of radiation device capable of providing continuously 1 kilowatt output of coherent light energy and utilizes materials, heretofore considered to be phosphors, as negative temperature media in such geometrical configuration that they can be pumped directly by a source of high voltage electrons. When such materials were used as phosphors they were in coarse powder form of comparatively large grain size of from one to a few microns. The present invention contemplates that these materials will preferably be in thin amorphous films.

There are a large group of cathodoluminescent materials which may be pumped by high voltage electrons. The particular ones of this group considered suitable for this invention are those having four levels. Their pumping cycle includes a phonon transition at either end of an electronic emission transition. In such materials there is a very strong coupling between the crystal lattice and the electronic transitions, thereby providing very wide band widths. Accordingly, their output frequencies can be tuned over broad intervals by optical cavity techniques. Since the atoms of the crystal lattice interact with forces, they obey Hooke's Law to a first approximation and the vibrations exhibit the characteristics of particles because their energies are limited to discrete values, much as the energies of light waves or light quanta. Accordingly, the phonons are considered as packets of wave energy propagated in an elastic medium and they result from the vibration of the crystal lattice.

Figure 1:
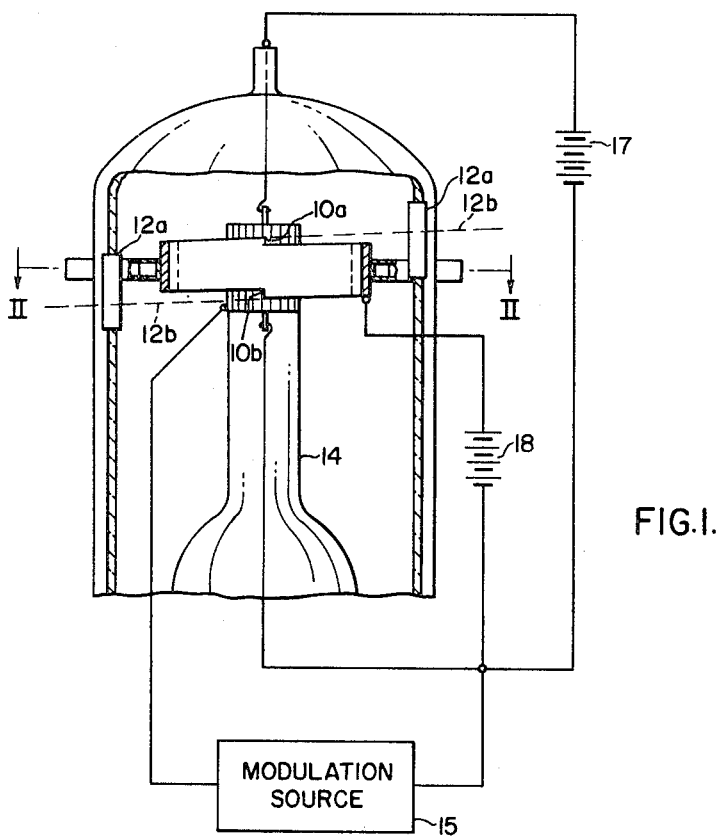
FIG. 1 is a profile view of one embodiment of the invention.

An embodiment of the invention is illustrated in FIG. 1 wherein a negative temperature medium 10 in the form of a hollow cylinder is mounted inside a metal substrate 11 which is properly supported in an evacuated envelope 12. A cathode 13 positioned inside the cylindrical medium 10 constitutes a source of high voltage electrons, all of which are directed outwardly toward the inner surface of the medium.

The evacuated envelope 12 may be made of material such as glass, with suitable planar optical windows 12a being provided for permitting the coherent light energy to be directed outside of the envelope in very narrow beams 12b in directions transverse to the axis of the cylindrical medium. In the embodiment illustrated, the envelope 12 is made of glass with an integral stem 14 supporting the substrate 11. The metal substrate 11 serves both as the support for the medium 10 and also as the anode of a cathode ray system which includes the cathode 13 and a control grid 16 interposed between the cathode and the metal substrate. The thickness of the walls of the cylindrical medium 10 is on the order of only a few wavelengths in terms of the output light in the case of continuous operation. In the case of the giant spike operation, the thickness could be increased. In the latter instance, the body of the medium could take on different shapes, such as a flat plate or slab.

In order to provide means for coupling the coherent output light out of the medium, the ends of the cylinder 10 have one or more planar offsets or shoulders 10a and 10b. To provide the shoulders 10a and 10b the ends of the cylinder 10 are in spiral formation about the cylindrical axis.

The planar faces of the shoulders 10a and 10b are optically polished and constitute apertures through which the coherent light energy is coupled out from the body of the cylinder. In order to combine the emerging rays from both of the faces of the shoulders into a single beam suitable lenses and mirrors may be provided to direct the light from one of the end faces into a direction parallel to and in coherence with the light from the other face. Such optical arrangements for accomplishing the end results are well understood by those skilled in the art.

The cathode 13 which may be either of a filament type or indirectly heated type may be energized from a suitable source of power, such as a battery 17 connected by suitable conductors to a terminal at the top of the envelope and a lead extending through the stem 14. A suitable source of high potential, such as the battery 18, is connected between one side of the cathode 13 and the substrate 11, which serves as the anode of the cathode ray system. A suitable modulation source 15 is connected between the common terminal between the two batteries, connected to one side of the cathode and the grid 16 for the purpose of modulating the flow of electrons from the cathode 13 through the negative temperature medium to the substrate anode 11. It is readily apparent to those skilled in the art that the stimulated emission of radiation output can be controlled by modulating the input energy from the electron beam. To provide means for cooling the negative temperature medium a suitable heat exchange jacket 21 is mounted in heat exchange relation with the substrate 11. Suitable coolant may be pumped through the inlet 22 and the outlet 23 of the jacket. Either the inlet or outlet may also serve as the anode connection.

Figure 3:
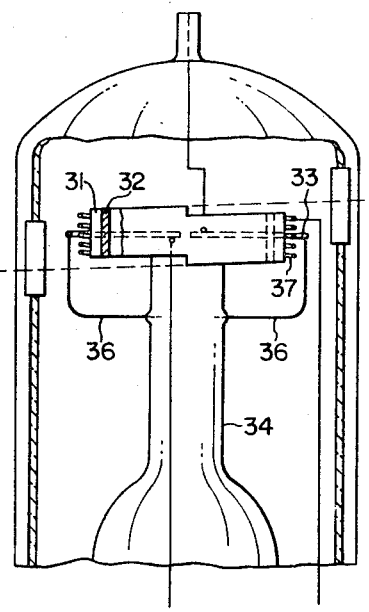
FIG. 3 is an isometric view of a modified form of the invention.

If desired, in accordance with a second embodiment as shown in FIG. 3, the cylindrical negative temperature medium 31 is arranged on the outside of the metal substrate 32. In this embodiment a circular cathode 33 is supported on stem 34 by means of spider arms 36. A spiral grid 37 is also supported on the stem 34.

In order to accomplish the desired end results of this invention, the negative temperature medium of which the cylinders 10 and 32 are made is selected from a group of cathodoluminescent materials having four discrete energy levels with a phonon transition coupled to each end of an electronic transition. This class of materials has advantages for modulated CW and giant pulse operation as well as for unmodulated high power CW use. Because these materials have a very strong lattice coupling to the electronic transitions they have relatively wide emission bands which makes it possible to tune them over a relatively broad range. The tuning can be accomplished by cavity techniques well known in the art. Also, the emission bands of these materials are in a range which makes it possible to provide output optical frequencies not heretofore obtainable with other materials.

The preferred material of this group is zinc silicate doped with manganese, $Zn_2SiO_4$:Mn. This material has several advantages. It has a luminescent efficiency in excess of 8 percent and it retains this efficiency up to 200°—300° C. The material may be used in single crystal form or in amorphous form. The latter is preferred. Because an amorphous film can be more readily bonded to the substrate, it is easier to grow an optically amorphous film than to cut a film section from a single crystal and greater flexibility of surface shapes can be provided with the amorphous films.

There are also two preferred methods of preparing the amorphous films, namely, by sprayed solution and by an evaporation process. The sprayed solution films are the most satisfactory because of the higher doping that is possible and because they can be baked in an inert atmosphere. Following the process described by R. D. Kirk and J. H. Schulman in the Journal of the Electrochemical Society, May, 1961, page 456, transparent luminescent films of this medium have been prepared having an efficiency comparable to the best films procurable by evaporated film process. Since the baking can be done in an inert atmosphere, any substrate with a melting point above 1100° C. can be used. A sprayed solution film has a lower optical loss than does an evaporated film. Using a stoichiometric ratio of $ZnCl_2$ to $MnCl_2 \cdot 4H_2O$ to give a film with a theoretical doping of 2 percent, a suitable film has been prepared. The silicate is supplied either by an excess of ethyl orthosilicate or phenyl silicate. The ethyl orthosilicate is preferred because it appears to combine with other components more readily. Hexyl alcohol is employed as a solvent for the spraying mixer. The solution is sprayed onto a substrate heated to around 250° C. with a DeVilbiss nebulizer which produces an extremely fine fog of the solution at low air pressure. The fineness of the spray favors the random conditions for a uniform amorphous film, while the low air pressure prevents the spray from cooling the substrate to below reaction temperature.

The substrate is sprayed while in the partially closed chamber and shielded from the direct spray. This surrounds it with an atmosphere of the solution and assures that no large droplets of the spray will hit the surface of the sample. The bakeout here is required as in the case of the evaporated films. The bakeout temperature can induce the alpha, beta, or gamma form if held to the proper limits. To insure the green alpha-form, it is only necessary to stay above 1100° C. The tremendous advantage of these films is that they do not require the presence of oxygen during the bakeout. This makes feasible many substrates which would be totally destroyed by oxidation were the luminescent film prepared by the evaporation method.

This technique can produce films which are virtually invisible on a quartz substrate. The film is not only uniform but exceedingly durable. Although its resistance to scratching is still excellent it is somewhat more easily scratched than quartz. The thickness of the film may be obtained by adjusting the rate and duration of spraying.

The thin cylindrical medium 10 can also be prepared by an evaporation process which is described in an article in the Journal of the Optical Society of America Vol. 48, page 816 (1958) by C. Feldman and M. O'Hara. An improvement in the process described in that article was achieved by cooling the substrate during the evaporation. This modification resulted in luminescent films of greater transparency, extremely high uniformity and having more rapid deposition rates. It should be noted that this high deposition rate is vital to the preparation of an optically uniform film, that is, it allows the substrate to be placed so far from the evaporation source that the variation in the deposited film thickness can be discounted. Furthermore, the cold substrate ultimately favors the alpha-$Zn_2SiO_4Mn$ whereas the method of Feldman and O'Hara randomly yields the alpha, beta or gamma form. It was found that good efficiency and high transparency are associated with crystal or grain size of dimensions less than 1 micron. Uncooled films have a grain size of the order of 20 microns while cooled films have grains that are undetectable under 800 power magnification. The evaporation method has one limitation since it produces films which must be activated by a bakeout in air for a minimum of 13 minutes at 900° C. Of the possible substrates which have good electrical and thermal conductivity virtually all are severely attacked under these conditions. For this reason, evaporated films will normally be deposited on quartz substrates and will be relied upon to achieve conductivity. An alternative to this would be to employ a conducting ceramic as the substrate.

Figure 4:
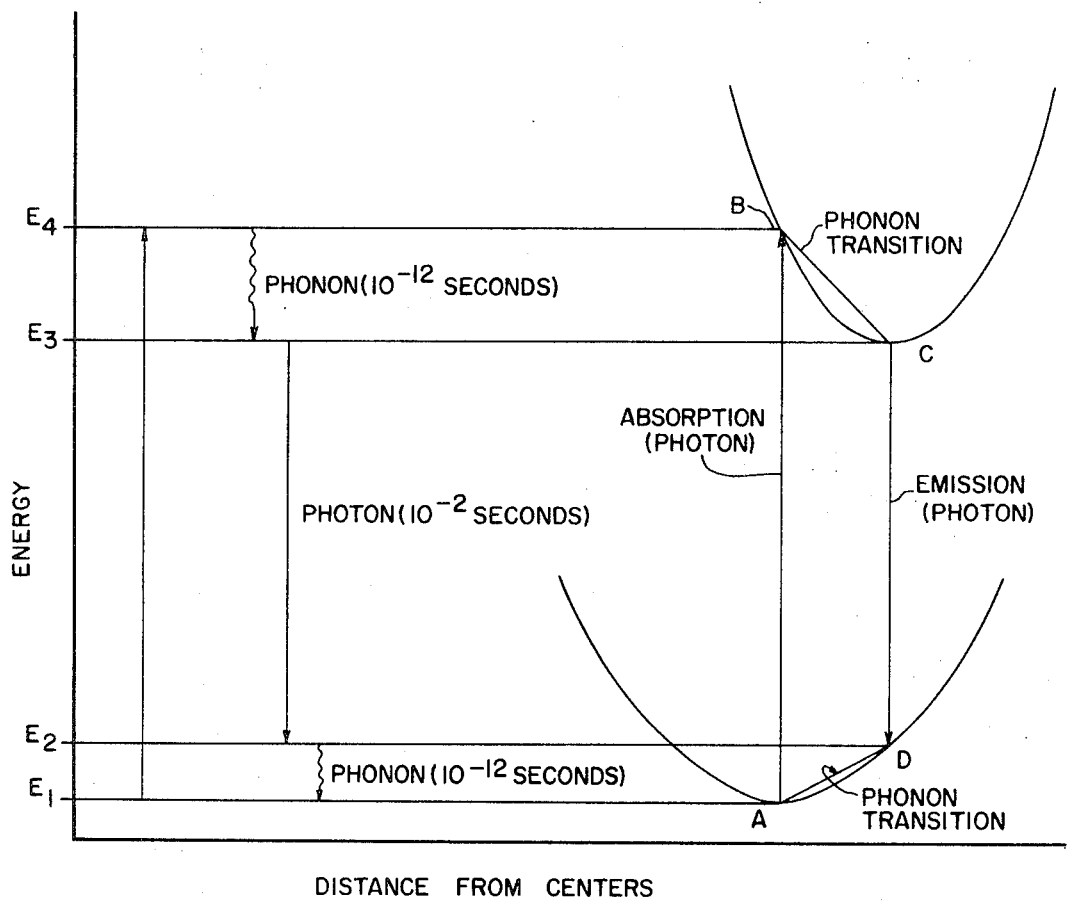
FIG. 4 is an energy diagram helpful in explaining the present invention.

FIG. 4 shows the configurational energy and a diagram for the $Zn_2SiO_4$:Mn. In this diagram, the abscissa represents a configuration coordinate, that is, the mean distance between the active ions and the neighboring lattice sites, while the ordinate represents energy. It will be seen that the complete energy cycle for the ion includes an electronic absorptive transition upward from A to B, which corresponds to the energy levels $E_1$ and $E_4$, respectively. It is to be noted that the absorption transition has a phonon transition coupled to each of its ends and to complete the cycle the laser output transition is coupled to the pump transition by a double phonon process. According to the Bohr frequency condition the laser transition frequency is a function of the energy difference between $E_3$ and $E_2$. In the photon-phonon coupling process for the materials used in this invention, the ions in the excited states, represented by the level $E_4$, fall down very rapidly by a phonon transition represented by the line BC to energy level $E_3$. This phonon transition from B to C represents a vibration of the lattice structure of the negative temperature medium and has a very short life. The electromagnetic wave emission transition, representing coherent light output, is an electronic transition from C to D during which the energy of the ion drops from $E_3$ to $E_2$. This relaxation time is very long as compared to the life of the phonon transition BC. To complete the cycle the ion passes through a second phonon transition from D to A, which corresponds to the energy level $E_1$.

The mechanism by which the ion passes through its cycle is substantially as follows. The ion first receives energy as it goes to $E_4$ without a shift in lattice ion positions. Then in a very short time, one the order of $10^{-12}$ seconds, the lattice ions around the absorbing ion change position slightly to make a more stable lattice configuration for the excited condition. This is accomplished by the emission of one or more phonons. This corresponds to the energy change from $E_4$ to $E_3$. This excited condition is held until stimulated or spontaneous emission of a photon occurs causing a transition from $E_3$ to $E_2$ from whence the ion reverts to a lower energy level within $10^{-12}$ seconds after the photon transition. This shift of the lattice to the original ground state condition, represented by the point A, again results in the emission of one or more phonons.

The significance of the photon-double phonon transition is, first, that the electronic transition is coupled to the lattice vibrations and is therefore not a sharp transition. This broadening of the emission of the electronic transition means a lower gain per centimeter since the gain is inversely proportional to the bandwidth. Secondly, the phonon lifetime for the ground state is extremely short compared to the mean lifetime of a purely electronic transition, providing at least three orders of magnitude improvement in this respect. Contrary to what might be expected, these latter two factors are very important when it is desired to produce giant pulse operation. In conventional laser materials the electronic transitions are not coupled to the lattice and this gives sharp emission lines. Sharp emission lines provide high laser gain per centimeter which causes losses when the material is being pumped prior to the giant spike pulse output. This is because the inverted population causes spontaneous emission amplification to take place in all directions, thus depopulating the excited state and causing useless output. This is particularly serious when long pump intervals are used to get high energy pulses. With the materials of this invention, the electronic transition terminates on a phonon transition which returns to ground state in a very short time interval. As distinguished from conventional laser media which return to the ground state in $10^{-8}$ to $10^{-10}$ seconds, ions of materials of the present invention return to ground state in about $10^{-12}$ seconds and thus reduce the time during which the ion can accept a photon and be excited to the upper level.

For purposes of illustration, the pumping power required is calculated for a specific material viz., $Zn_2SiO_4$:Mn, a suitable material for this invention. The required number of inverted ions per $cm.^3$ is given by $$N = \alpha(54\tau\Delta Y)/\lambda^2 \quad (1)$$

where N is the number of inverted centers per $cm.^3$; $\tau = 10^{-12}$ sec., the lifetime of the emitting state; $\lambda = 3.05 \times 10^{-15}$ cm., the wavelength in the medium; $\Delta Y = 2.5 \times 10^{13}$/sec., the emission bandwidth; and $\alpha$ is 2 percent/cm. gain. Substituting the above values in equation (1) gives $$N \cong 3 \times 10^{20}/cm.^3 \quad (2)$$

Doping levels as high as 10 percent Mn have been used in $Zn_2SiO_4$Mn whereas the value of $N$ shown in equation (2) represents a doping level of less than 1 percent. The pump power required can be found directly once the volume of excited material is known. For 30 KV electrons, the penetration depth is about 1.6 mg/cm.² or with a material density of 4 grams/cm.³, the range is about 4 microns. This gives only $(A \times 4\alpha\frac{3}{4}^{1014})$ cm.³ volume to be excited, where $A$ is the surface area in cm.² of the laser medium. The pumping power per square centimeter is then $$P = NhY/\tau V/\eta \cong 50 \text{ watts/cm.}^2 \quad (3)$$

where $N=3\times10^{20}$ centers/sec.

$h=6.6\times10^{134}$ joule-sec., Planck's Constant
$Y=6\times10^{14}$/sec. = emission frequency
$\tau=10^{12}$ sec. = lifetime
$V=$ volume $=4\times10^{14}$ cm.³
$\eta=$ fluorescence efficiency= 10 percent This is an extremely low threshold in watts/cm.² even though the total power input of $\cong 10^5$ watts/cm.³ is very high. If the optical loss is less than 2 percent/cm.; as with optical glasses, then a considerably lower threshold is possible.

The choice of the proper substrate for the negative temperature medium of the present invention is restricted by the following requirements:

1. The substrate should have good electrical and thermal conductivity.
2. It must withstand about 1100° C. activation baking without melting or flowing.
3. It must be able to take a high polish on its surface.
5. Its coefficient of thermal expansion must be close to that of $Zn_2SiO_4$ in the range of 0° C. to 1100° C. which is about 3—4×0¹⁶ per degree Centigrade.

Platinum appears to fulfill all these requirements.

I claim:

1. Stimulated emission of radiation apparatus comprising a body of negative temperature medium in the form of a hollow cylinder, means for irradiating said medium with electrons for exciting the ions of said medium to obtain a negative temperature in said medium, the radial dimension of said cylinder being not substantially greater than the depth of penetration by said electrons, said body having output means coupled to at least one end of said cylinder, said output means comprising an integral projection having a plane face which makes an angle greater than the critical angle with respect to photon energy circulating in said cylinder, whereby radiation is coupled out from the body of the cylinder.

2. The combination as set forth in claim 1 in which said negative temperature medium is of the type having phonon transitions connected to the initial and terminal states of electronic transitions.